US008950880B2

(12) United States Patent
Hamada

(10) Patent No.: US 8,950,880 B2
(45) Date of Patent: Feb. 10, 2015

(54) LIGHTING DEVICE AND PHOTOGRAPHING SYSTEM INCLUDING THE SAME

(75) Inventor: Masataka Hamada, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/593,905

(22) Filed: Aug. 24, 2012

(65) Prior Publication Data

US 2013/0155644 A1    Jun. 20, 2013

(30) Foreign Application Priority Data

Dec. 19, 2011    (KR) .................. 10-2011-0137420

(51) Int. Cl.
*G03B 15/02*    (2006.01)
(52) U.S. Cl.
USPC ............... 362/11; 362/16; 362/331; 362/332; 362/244
(58) Field of Classification Search
USPC ......... 362/3, 11, 16, 311.06–311.1, 326, 235, 362/241, 244, 331–340
See application file for complete search history.

(56) References Cited

U.S. PATENT DOCUMENTS

| 7,052,151 B2 * | 5/2006 | Terada et al. ................... 362/16 |
| 2006/0133061 A1 * | 6/2006 | Maeda ............................... 362/6 |

FOREIGN PATENT DOCUMENTS

| JP | 2001-272505 A | 10/2001 | |
| JP | 2004-317922 A | 11/2004 | |
| JP | 2004317922 A | * 11/2004 | ............... G02B 1/11 |
| JP | 2005-132660 A | 5/2005 | |
| JP | 2009-098237 A | 5/2009 | |
| JP | 2009098237 A | * 5/2009 | |

OTHER PUBLICATIONS

Machine Translation of JP 2009-098237.*
Machine Translation of JP 2004-317922.*
Refractive Index of Silica Glass.*
Refractive Index of PMMA.*
Refractive Index of Polycarbonate.*
High Refractive Index—Low Refractive Index Resins.*

* cited by examiner

*Primary Examiner* — Diane Lee
*Assistant Examiner* — Naomi M Wolford
(74) *Attorney, Agent, or Firm* — Drinker Biddle & Reath LLP

(57) ABSTRACT

A lighting device and a photographing system including the same are provided. The lighting device including a plurality of light emitting devices which emit lights of wavelengths within the visible ray domain; and an opening arranged in front of the plurality of light emitting devices, wherein the plurality of light emitting devices are arranged in a medium having a low refraction index, and solid structures that are formed of a medium having a high refraction index, are capable of transmitting visible rays therethrough, and are periodically formed on a portion of the opening to face the plurality of light emitting devices, wherein the solid structures are formed in a period such that lights emitted by the plurality of light emitting devices are not reflected.

19 Claims, 13 Drawing Sheets

LIGHTING DEVICE AND PHOTOGRAPHING SYSTEM INCLUDING THE SAME

CROSS-REFERENCE TO RELATED PATENT APPLICATION

This application claims the benefit of Korean Patent Application No. 10-2011-0137420, filed on Dec. 19, 2011, in the Korean Intellectual Property Office, the disclosure of which is incorporated herein in its entirety by reference.

BACKGROUND

Disclosed herein is a lighting device and a photographing system including the same.

Since the portability of digital photographing devices, such as digital cameras and digital camcorders, has improved due to technical advancements in parts miniaturization and lifespan of batteries, it is now possible to easily capture images anywhere. Furthermore, recent digital photographing devices provide various functions enabling even non-experts to capture fine images.

To capture a fine image of an object, sufficient light should be emitted onto the object. If light emitted onto the object is insufficient, it is difficult to perform a focusing operation. Furthermore, even if an image of an object is captured, the image is dark, and thus, it is difficult to recognize the captured object. Therefore, a digital photographing device may include a lighting device or an external lighting device may be used in conjunction with the digital photographing device for occasionally emitting light onto an object to be photographed.

SUMMARY

Various embodiments of the invention provide a lighting device for efficiently emitting light onto an object and a photographing system including the same According to an embodiment of the invention, there is provided a lighting device including a plurality of light emitting devices which emit lights of wavelengths within the visible ray domain; and an opening arranged in front of the plurality of light emitting devices, wherein the plurality of light emitting devices are arranged in a medium having a low refraction index, and solid structures that are formed of a medium having a high refraction index, are capable of transmitting visible rays therethrough, and are periodically formed on a portion of the opening to face the plurality of light emitting devices, wherein the solid structures are formed in a period as such lights emitted by the plurality of light emitting devices are not reflected.

At the opening, the solid structures are arranged in a first period in front of the center region of the plurality of light emitting devices, and the solid structures are arranged in a second period in front of the peripheral region of the plurality of light emitting devices, wherein the second period is greater than the first period.

The solid structures arranged in the first period are arranged in a four-direction arrangement, and the solid structures arranged in the second period are arranged in a six-direction arrangement.

The first period is from about 150 nm to about 250 nm, and the second period is from about 200 nm to about 300 nm.

At the opening, a Fresnel lens for emitting auxiliary light is arranged on a surface facing the light emitting devices, and the solid structures are formed on a surface of the Fresnel lens.

The solid structures are arranged in a first period at the center region of the Fresnel lens, and the solid structures are arranged in a second period at the peripheral region of the Fresnel lens, wherein the second period is greater than the first period.

At the opening, a lens for emitting auxiliary light is arranged on a surface facing the light emitting devices.

The lighting device is used as an auxiliary light for a camera.

The auxiliary light for a camera is either a photographing auxiliary light or an auxiliary light for focus detection.

The solid structures are arranged in a period from about 150 nm to about 300 nm, the high refraction index is from about 1.4 to about 2.2, and the low refraction index is the refraction index of air.

The light emitting device is an LED, an EL, or an OLED.

The light emitting device emits lights of wavelengths from about 400 nm to about 700 nm.

The light emitting devices emit color lights of a group consisting of white, red, green, and blue, a group consisting of cyan, magenta, and yellow, or a combination thereof.

Wavelengths of lights emitted by the light emitting devices are variable.

The embodiment ratio of the solid structure is 1 or greater.

The solid structure is a cone structure, a circular cylinder structure, a flat panel structure, or a circular truncated cone structure.

The solid structures are arranged in a four-direction arrangement or a six-direction arrangement.

The lighting device further includes an infrared ray (IR) emitting device which emits lights of wavelengths within IR domain, wherein the solid structures are formed to prevent reflection of the lights of wavelengths within IR domain.

The IR emitting device emits color lights of a red light emitting device, an IR emitting device, or a combination thereof.

According to another embodiment of the invention, there is provided a photographing system including an image capturing unit which captures images of an object; a lighting device which emits light to the object; and a lighting control unit which controls light emission of the lighting device, wherein the lighting device includes a plurality of light emitting devices which emit lights of wavelengths within visible ray domain; and an opening arranged in front of the plurality of light emitting devices, wherein the plurality of light emitting devices are arranged in a medium with a low refraction index, solid structures that are formed of a medium having a high refraction index, are capable of transmitting visible rays therethrough, and are periodically formed on a portion of the opening to face the plurality of light emitting devices, and wherein the solid structures are arranged in a period as such lights emitted by the plurality of light emitting devices are not reflected.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Figure 1:
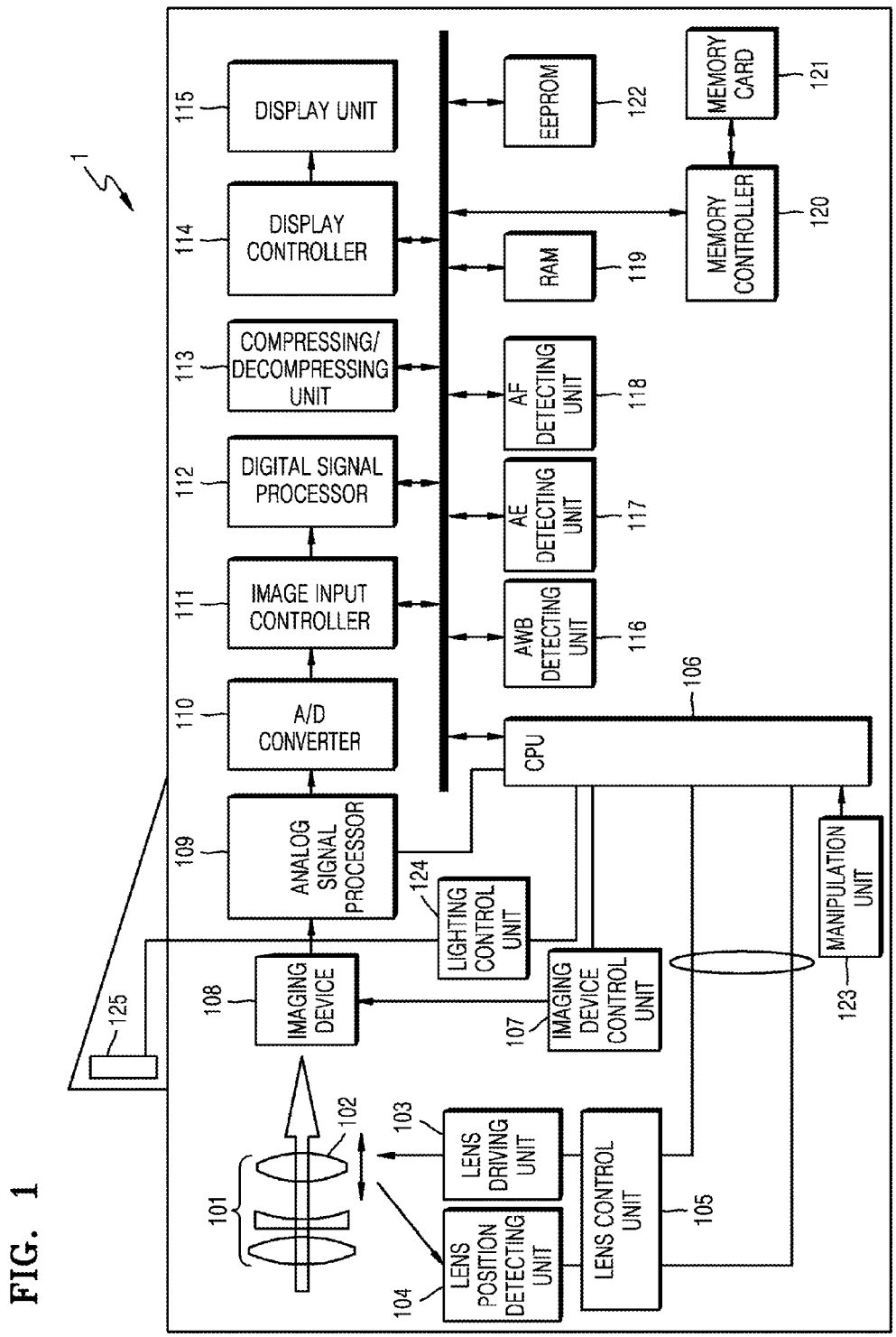
FIG. 1 is a block diagram of a digital photographing device according to an embodiment of the invention.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Those components that are the same or are in correspondence are rendered the same reference numeral regardless of the figure number, and redundant explanations are omitted.

FIG. 1 is a block diagram of a digital photographing device 1 according to an embodiment of the invention.

Referring to FIG. 1, the digital photographing device 1 includes an imaging lens 101, a lens driving unit 103, a lens position detecting unit 104, a lens control unit 105, a CPU 106, an imaging device control unit 107, an imaging device 108, an analog signal processor 109, an A/D converter 110, an image input controller 111, a digital signal processor 112, a compressing/decompressing unit 113, a display controller 114, a display unit 115, an AWB detecting unit 116, an AE detecting unit 117, an AF detecting unit 118, a RAM 119, a memory controller 120, a memory card 121, an EEPROM 122, an manipulation unit 123, a lighting control unit 124, and a lighting device 125.

The imaging lens 101 includes a focus lens 102 and focus may be adjusted by driving the focus lens 102.

The lens driving unit 103 drives the focus lens 102 under the control of the lens control unit 105, and the lens position detecting unit 104 detects position of the focus lens 102 and transmits the detected position to the lens control unit 105.

The lens control unit 105 controls operation of the lens driving unit 103 and receives position information from the lens position detecting unit 104. Furthermore, the lens control unit 105 communicates with a CPU 106 and exchanges information regarding focus detection.

The CPU 106 controls overall operations of the digital photographing device 1.

The imaging device control unit 107 generates a timing signal and applies the timing signal to the imaging device 108 to control image capturing operation of the imaging device 108. Furthermore, the imaging device control unit 107 controls to sequentially read out image signals when charge accumulation is completed at each of scan lines of the imaging device 108.

The imaging device 108 picks up image light from an object via the imaging lens 101 and generates image signals. The imaging device 108 may include a plurality of photoelectric conversion devices that are arranged in a matrix shape and a charge transfer path for transferring charges from the photoelectric conversion devices.

The analog signal processor 109 removes noises from image signals read out by the imaging device 108 or amplifies image signals to an arbitrary level. The A/D converter 110 converts analog image signals output by the analog signal processor 109 to digital image signals. Furthermore, the image input controller 111 processes image signals output by the A/D converter 110 to be available for later image processes.

Image signals output by the image input controller 111 are processed for auto white balance (AWB), auto exposure (AE), and auto focus (AF) by the AWB detecting unit 116, the AE detecting unit 117, and the AF detecting unit 118, respectively.

Image signals output by the image input controller 111 may also be temporarily stored in the RAM 119, which includes a SDRAM or the like.

The digital signal processor 112 generates live-view images or a captured image that may be displayed on the display unit 115 by performing a series of image signal processes, such as gamma correction, with respect to image signals output by the image input controller 111. Furthermore, the digital signal processor 112 may adjust white balance of a captured image based on a white balance gain detected by the AWB detecting unit 116. In other words, the digital signal processor 112 and the AWB detecting unit 116 may constitute an example of white balance control units.

The compressing/decompressing unit 113 compresses and decompresses image signals to which image processes have been performed. In the case of compression, the compressing/decompressing unit 113 compresses image signals in the JPEG compression format or the H.264 compression format.

An image file containing image data generated by the compression is transmitted to the memory controller 120, and the memory controller 120 stores the image file in the memory card 121.

The display controller 114 controls image output to the display unit 115. Furthermore, the display unit 115 displays a captured image, live-view images, and various setup information. The display unit 115 may consist of a liquid crystal display (LCD) unit and a LCD driver. However, the invention is not limited thereto, and an organic EL (OLED) display and a driving unit thereof may be employed instead.

The RAM 119 may include a VRAM for temporarily storing data, such as images to be displayed on the display unit 115, whereas the EEPROM 122 may store a program or various information for controlling the digital photographing device 1.

The manipulation unit 123 is a unit via which a user inputs various commands for operating the digital photographing device 1. The manipulation unit 123 may include various buttons, such as a shutter-release button, a main switch, a mode dial, a menu button, etc.

The lighting control unit 124 is a circuit for driving a photographing auxiliary light or an AF auxiliary light and drives the lighting device 125, such that a light emitting device included in the lighting device 125 emits light to an object during a photographing operation or an AF operation.

The lighting device 125 is a device for emitting auxiliary light required during an AF operation or a photographing operation. The lighting device 125 may a adjust color temperature of auxiliary light to be emitted. The light emitting device included in the lighting device 125 may be a solid light emitting device, such as a LED, an OLED, an EL, etc.

Although FIG. 1 shows an example in which the lighting device 125 is integrated with the digital photographing device 1, the invention is not limited thereto. For example, the lighting device 125 may be attached to and detached from the digital photographing device 1.

Furthermore any components used to capture an image, for example the imaging lens 101, the CPU 106, the imaging device control unit 107, the imaging device 108, the digital signal processor 112 may constitute an example of image capturing unit. However the invention is not limited thereto, any other component may be included in the photographing unit.

Detailed descriptions of embodiments of the lighting device 125 will be given below.

Figure 2A:
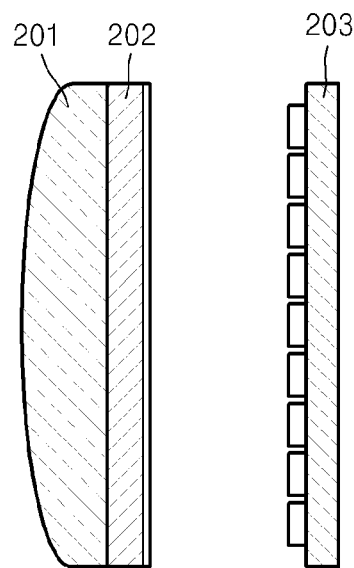
FIGS. 2A and 2B are side view diagrams showing a lighting device according to an embodiment of the invention.
Figure 2B:
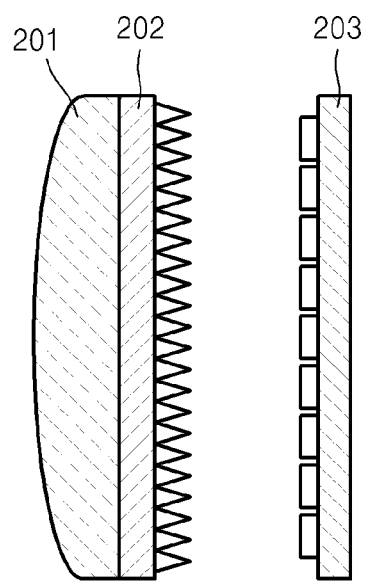

FIGS. 2A and 2B are diagrams showing the lighting device 125 according to an embodiment of the invention.

Referring to FIGS. 2A and 2B, the lighting device 125 includes an emission lens 201, an opening 202, and a light emitting device 203. FIG. 2B is a magnified view of a periodic solid structure formed at the opening 202.

As described above, the light emitting device 203 may be a solid light emitting device, such as a LED, an OLED, or an EL. The lighting device 125 may be used as an auxiliary light for the digital photographing device 1, and thus, the light emitting device 203 may emit light of a wavelength within the visible ray domain. The light emitting device 203 may include a plurality of light emitting pallets.

The opening 202 is a transparent panel having a 3-dimensional structure in which a fine structure is formed toward the light emitting device 203. The fine structure of the opening 202 is formed as a non-reflective structure for eliminating light reflection when light is incident from a low-refractive medium including the light emitting device 203 to the opening 202, which is a high-refractive medium.

Light emitted by the light emitting device 203 is emitted to an object via the emission lens 201. Since height of the fine structure at the opening 202 is very small, the fine structure is shown as a flat surface in FIG. 2A. FIG. 2B shows a magnified view of the fine structure.

The entire opening 202 according to the present embodiment including the fine structure for non-reflectivity may be formed of the same material. In other words, the entire opening 202 may be formed as a single body.

Figure 3:
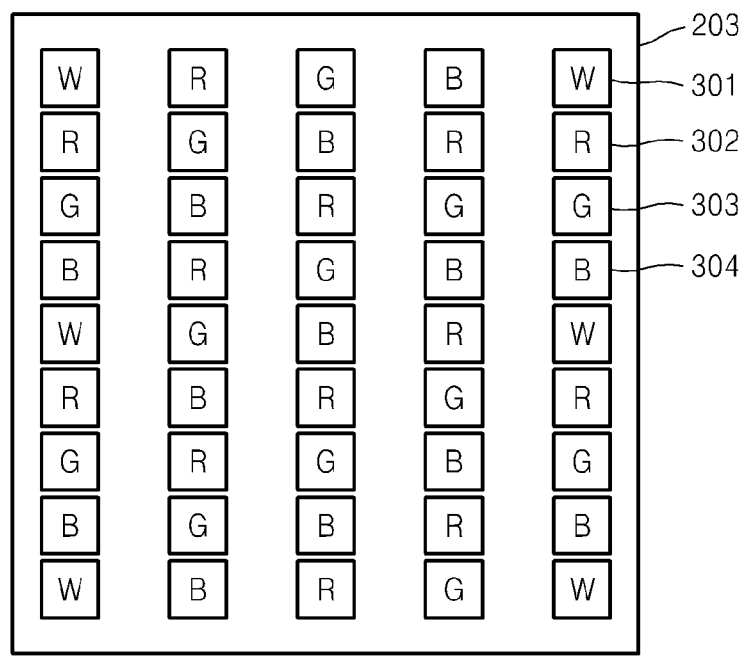
FIG. 3 is a plan view diagram showing a light emitting device according to an embodiment of the invention.

FIG. 3 is a diagram showing the light emitting device 203 according to an embodiment of the invention.

Referring to FIG. 3, the reference numeral W denotes a white light emitting device 301, the reference numeral R denotes a red light emitting device 302, the reference numeral G denotes a green light emitting device 303, and the reference numeral B denotes a blue light emitting device 304. Color temperature of light emitted to an object may be adjusted by adjusting output ratio of each of color light emitting devices. When the light emitting device 203 is used as an AF auxiliary light, all light emitting pallets may emit light. However, in consideration of energy efficiency, only the green light emitting device 303 or the white light emitting device 301 having excellent sensitivity for AF detection may emit light.

Although FIG. 3 shows LED pallets arranged in 9 rows and 5 columns, the invention is not limited thereto, and the light emitting device 302 may include LED pallets of any of various numbers and arrangements.

Figure 4:
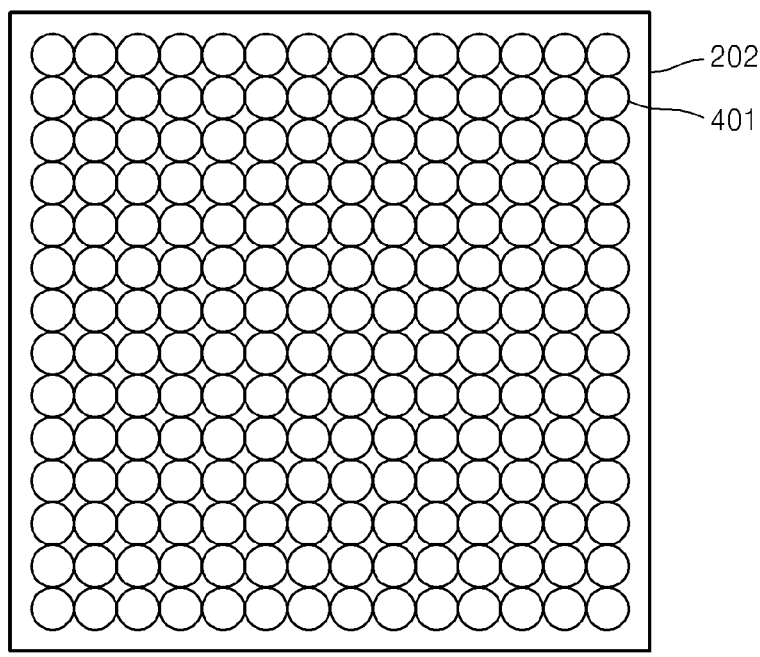
FIGS. 4 and 5 are respectively plan and perspective view diagrams showing openings according to an embodiment of the invention.
Figure 5:
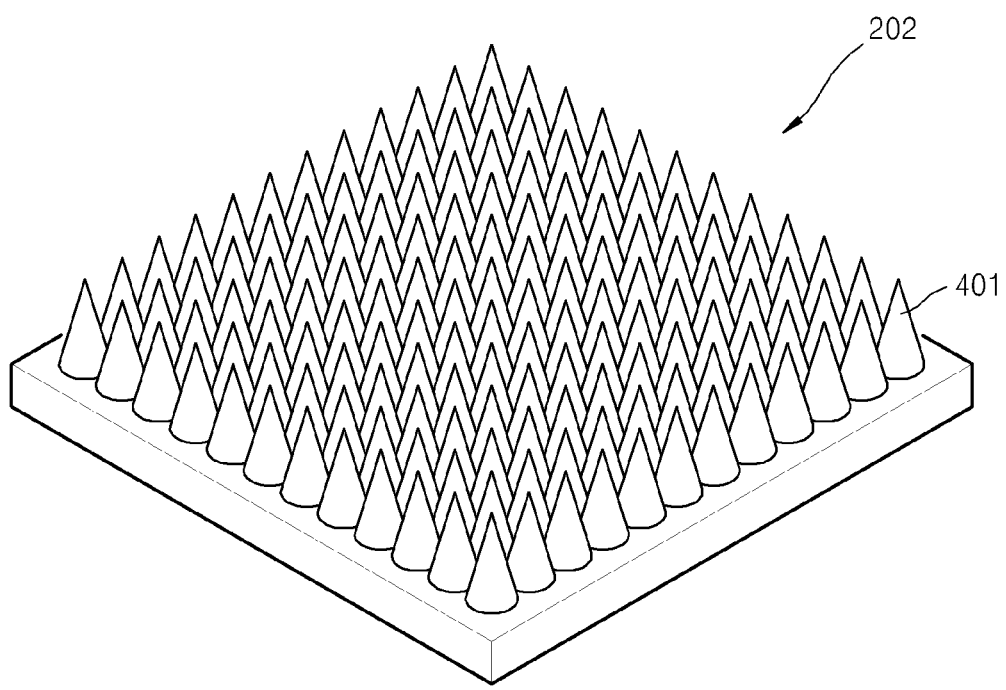

FIG. 4 is a front view of the opening 202 according to an embodiment of the invention, and FIG. 5 is a diagram showing the opening 202 of FIG. 4 in perspective view.

Referring to FIGS. 4 and 5, a plurality of circular cone structures 401 are formed at the opening 202. The circular cone structures 401 are periodically arranged for transmitting visible rays. If wavelengths of visible rays are from about 400 nm to about 700 nm, the opening 202 is designed as a non-reflective structure for transmitting light of the range of wavelengths by arranging the circular cone structures 401 at a period from about 150 nm to about 300 nm. For example, if the circular cone structures 401 are arranged at a period of 200 nm and ratio between height and width (referred to hereinafter as 'embodiment ratio') 1.25:1, the height of the circular cone structures 401 is about 250 nm.

The opening 202, that is, the circular cone structures 401 may be formed of quartz, glass having material properties similar to those of quartz, or transparent ceramic. Refraction indexes of such materials may be from about 1.43 to about 2.14. Alternatively, the opening 202 may be formed of a transparent resin. In this case, refraction index of the transparent resin may be from about 1.49 to about 1.6. However, the materials stated above are merely examples, and the invention is not limited thereto.

The non-reflective structure of the opening 202 will be described below in detail. When light is incident at a relatively small angle (angle of incidence is large), light is reflected (light is lost). In this case, about 30% or more of the light is lost due to reflection. The non-reflective structure is employed to eliminate the reflection.

From a microscopic perspective, a non-reflective structure may be considered in view of a gradational structure of which the refraction index distribution changes gradually, and in view of a diffraction grid. In the case of the former, when the materials are air and glass for example, it is understood that light reflection may not occur since the refraction index changes gradually from about 1 to about 1.49 in a solid structure. On the other hand, a non-reflective structure may be understood as the diffraction grid. If a light out-coupling unit is used in a LED device and if a non-reflective structure is formed of a material as described above, the $0^{th}$ order diffraction light is incident at an angle larger than a critical angle and is totally reflected, and thus no light is out-coupled to the outside. However, light may be out-coupled by the $1^{st}$ order diffraction light.

According to embodiments of the invention, a non-reflective structure is used in the opening 202 of the light emitting device 203. A light pass through from high refraction index material to low refraction index material in the LED device. However a light pass through from low refraction index material to high refraction index material in the embodiments of the invention, which is different from the LED device case.

Figure 6A:
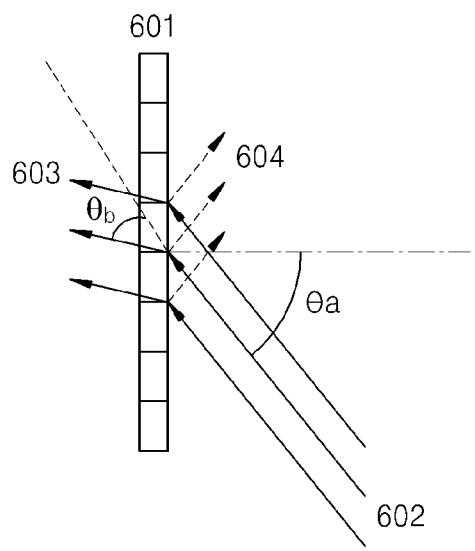
FIGS. 6A and 6B are side view diagrams for describing diffraction angles of incident light according to grid sizes.
Figure 6B:
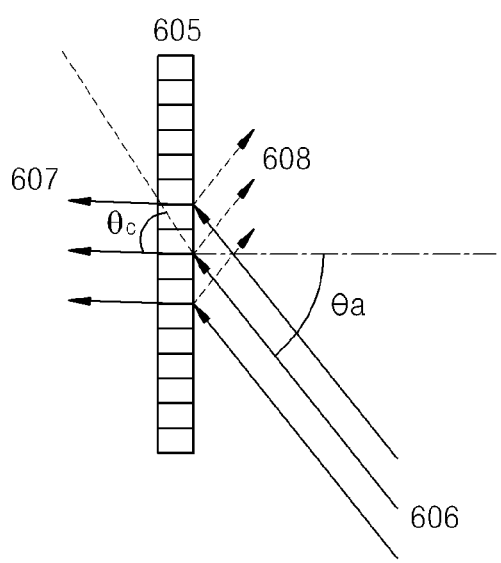

FIGS. 6A and 6B are diagrams for describing diffraction angles of incident light according to grid sizes. In other words, FIGS. 6A and 6B are diagrams for describing a case in which the non-reflective structure of the opening 202 is considered as a diffraction grid. When the wavelength of light is denoted as $\lambda$, the grid constant (interval of the diffraction grid) is denoted as d, and the diffraction angle is denoted as X, the relation between them is expressed as $d\sin\theta=n\lambda$ (here, $n=0, \pm1, \pm2$, and so on).

Referring to FIG. 6A, when an incident light 602 is incident to a diffraction grid 601 at an angle of incidence $\theta a$, a $1^{st}$ order diffraction light 603 is generated. A diffraction angle of the $1^{st}$ order diffraction light 603 is $8b$.

Referring to FIG. 6B, as in FIG. 6A, when an incident light 606 is incident to a diffraction grid 605 at an angle of incidence $\theta a$, a $1^{st}$ order diffraction light 607 is generated. A diffraction angle of the $1^{st}$ order diffraction light 607 is $\theta c$. Here, the diffraction angle $\theta c$ is larger than $\theta b$.

In other words, when the grid constant decreases, the diffraction angle increases. In other words, regarding the same diffraction direction, a smaller grid constant may be advantageous with respect to a larger angle of incidence. Therefore, if the directions in which lights are out-coupled are the same, a diffraction grid with a smaller grid constant may out-couple light incident at a larger angle of incidence. Furthermore, in terms of the wavelength of light, a light with larger wavelength is diffracted at a larger angle.

In consideration of the diffraction mechanism described above, it shows that it is desirable to arrange diffraction grids densely for large angles of incidence.

Figure 7A:
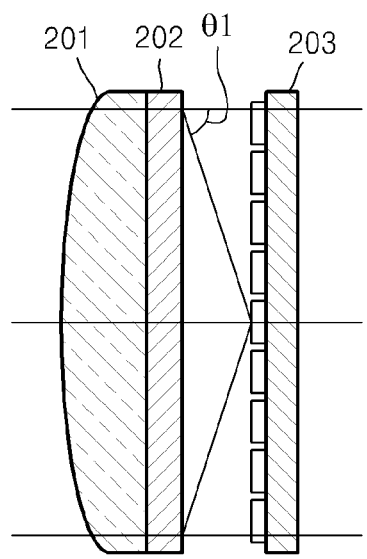
FIGS. 7A and 7B are side view diagrams for describing an angle of incidence of light incident from a light emitting device to an opening in the lighting device according to an embodiment of the invention.
Figure 7B:
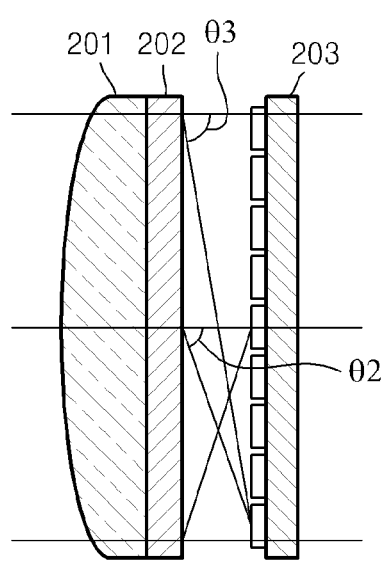

FIGS. 7A and 7B are diagrams for describing an angle of incidence of light incident from the light emitting device 203 to the opening 203 in the lighting device 125 according to an embodiment of the invention.

Referring to FIG. 7A, an angle of incidence of light which is emitted by LED pallets arranged at the center of the light emitting device 203 and is incident onto an end of the opening 202 having a non-reflective structure is $\theta 1$. In contrast, referring to FIG. 7B, an angle of incidence of light which is emitted by LED pallets arranged at an end of the light emitting device 203 and is incident onto the center of the opening 202 having a non-reflective structure is $\theta 2$, which is similar to $\theta 1$.

However, an angle of incidence of light which is emitted by LED pallets arranged at an end of the light emitting device 203 and is incident to an end of the opening 202 having a non-reflective structure is $\theta 3$, which is larger than $\theta 1$. In other words, reflection is likely to occur due to a large angle of incidence.

Therefore, it is necessary to arrange the non-reflective structure of the opening 202 according to the present embodiment, such that reflection does not occur even if light is incident at a large angle of incidence. Therefore, it is necessary to determine an interval between solid structures arranged in the non-reflective structure of the opening 202 based on an angle of incidence determined according to size of the lighting device 125 used in the digital photographing device 1. Furthermore, for further reduction of reflection and improvement of light transmittance, solid structures arranged in a plurality of periods are required. Furthermore, to reduce reflection and improve light transmittance with respect to a plurality of light source wavelengths, it is necessary to determine a period of solid structures or to arrange solid structures in a plurality of periods, according to the light source wavelengths.

Referring back to FIGS. 4 and 5, the circular cone structures 401 are used as solid structures for a non-reflective structure. The reason of using the circular cone structures 401 is to improve an efficiency of out-coupling light incident at shallow angles of incidence. Furthermore, it is easy to form cones or circular truncated cones via an etching operation or a molding operation. Circular truncated cones may be formed by flattening vertexes of cones.

Figure 8:
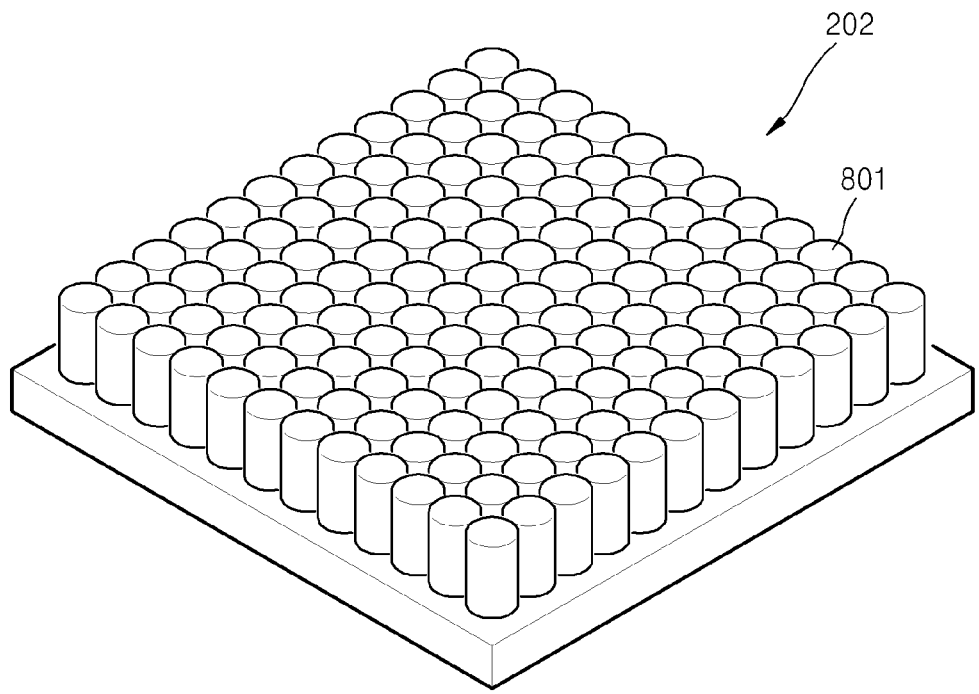
FIG. 8 is a perspective view diagram showing an opening according to another embodiment of the invention.

FIG. 8 is a diagram showing the opening 202 according to another embodiment of the invention. Referring to FIG. 8, circular cylinder structures 801 are periodically arranged as solids structures of a non-reflective structure of the opening 202. Compared to the non-reflective structure according to the embodiment shown in FIG. 5, the non-reflective structure according to the present embodiment is less transmissive, but is easier to manufacture.

Figure 9:
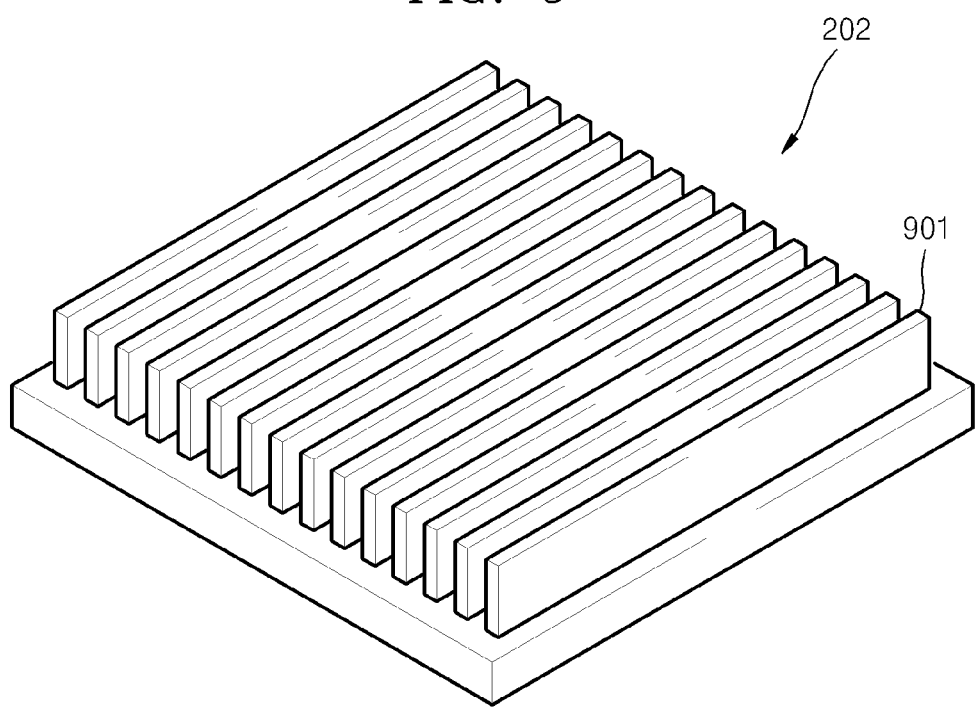
FIG. 9 is a perspective view diagram showing an opening according to another embodiment of the invention.

FIG. 9 is a diagram showing the opening 202 according to another embodiment of the invention. Referring to FIG. 9, flat panel structures 901 are periodically arranged as solids structures of a non-reflective structure of the opening 202. Compared to the non-reflective structure according to the embodiment shown in FIG. 5, the non-reflective structure according to the present embodiment is less transmissive and is non-reflective in one direction only, but is easier to manufacture.

The various solid structures as described above may be slightly deformed during formation thereof. For example, the circular cylinder structures 801 may be deformed to have a circular truncated cone-like shape or protrusions and recessions may be formed on lateral surfaces of the flat panel structures 901.

Figure 10:
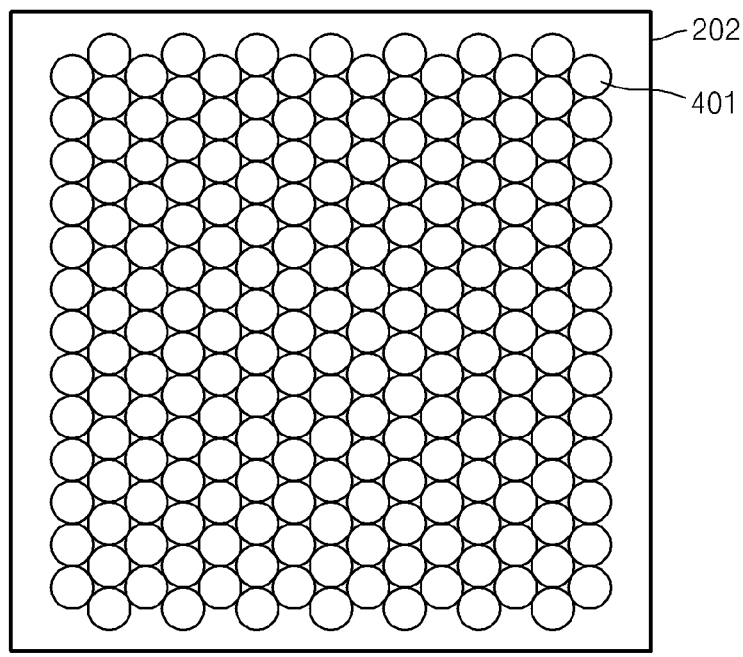
FIGS. 10 and 11 are, respectively, plan and perspective view diagrams showing an opening according to another embodiment of the invention.
Figure 11:
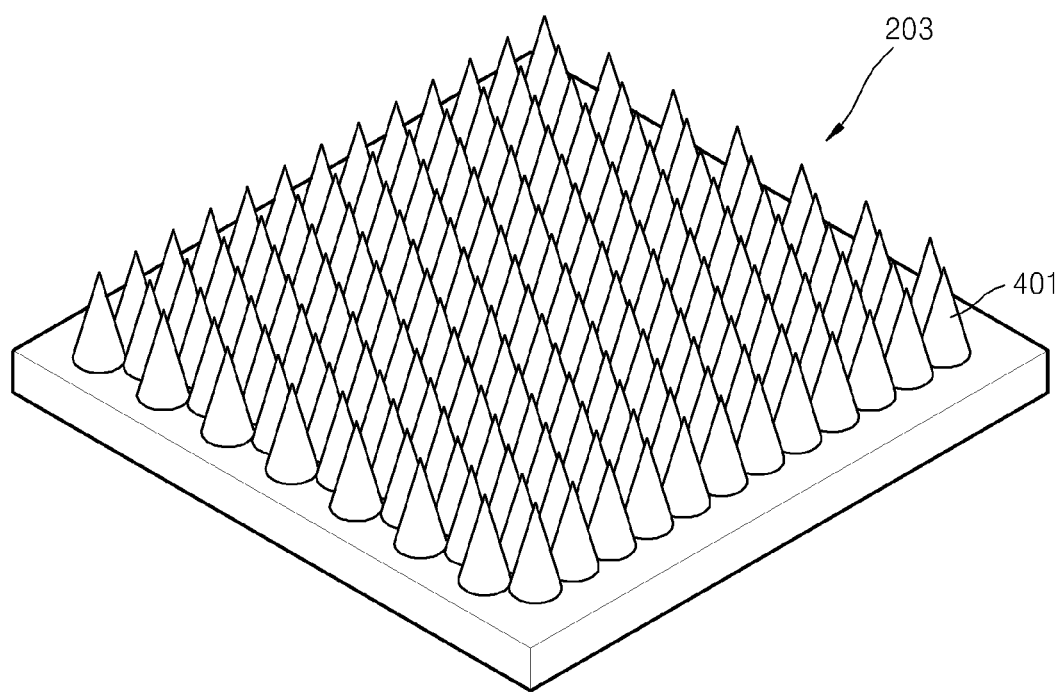

FIGS. 10 and 11 are diagrams showing the opening 202 according to another embodiment of the invention. FIG. 10 is a front view of the opening 202 according to the present embodiment, whereas FIG. 11 is a perspective view diagram showing the opening 202 of FIG. 10.

FIGS. 10 and 11 show a case in which the circular cone structures 401 are arranged in a manner different from those shown in FIGS. 4 and 5. In the embodiment shown in FIG. 4, the sold structures are arranged to contact each others in four directions (four direction arrangement). In other words, lines interconnecting centers of the solid structures form squares contacting each others. However, in the present embodiment, the solid structures contact each others in six directions (six-direction arrangement). In other words, lines interconnecting centers of the solid structures form hexagons contacting each others. In other words, the solid structures form a honeycomb structure.

In this case, a period of solid structures may be reduced while height of the solid structures is maintained. Therefore, an embodiment ratio may be substantially increased for improved non-reflection efficiency. For example, if the reflectivity in the four-direction arrangement as shown in FIG. 4 is about 0.3%, the reflectivity in the six-direction arrangement as shown in FIG. 10 is about 0.05%. In other words, the six-direction arrangement results in lower reflectivity.

Figure 12:
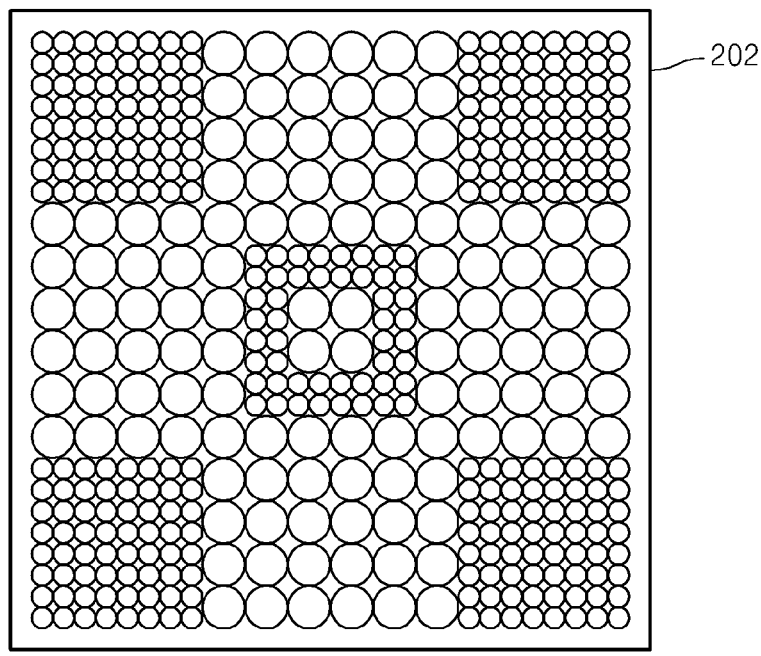
FIG. 12 is a plan view diagram showing an opening according to another embodiment of the invention.

FIG. 12 is a diagram showing the opening 202 according to another embodiment of the invention. Referring to FIG. 12, the non-reflective structure of the opening 202 includes solid structures arranged in a plurality of periods. The non-reflective structure according to the present embodiment may be applied with respect to a light source with a large angle of incidence or a light source emitting lights of a plurality of wavelengths.

Although the present embodiment refers to a light source emitting lights of two wavelengths, the invention is not limited thereto. For example, a light source emitting lights of three or more wavelengths may be employed.

Furthermore, the non-reflective structure of the opening 202 is not limited to that shown in FIG. 12. For example, the non-reflective structure of the opening 202 may not only have a four-direction arrangement, but also have a six-direction arrangement. Furthermore, solid structures of the non-reflective structure of the opening 202 may be arranged in any of various manners or arranged in combinations of the various manners as long as the periods are from about 150 nm to about 300 nm which is capable of handling angles of incidence or wavelength of the light source.

Figure 13:
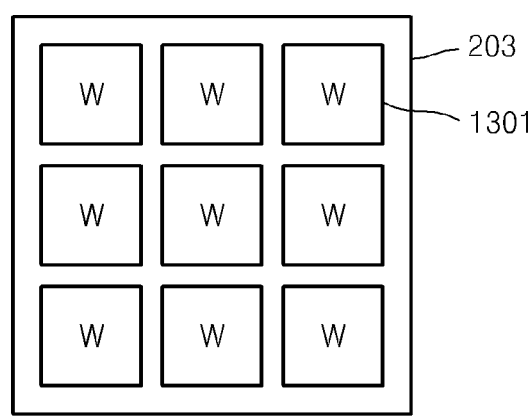
FIG. 13 is a plan view diagram showing a light emitting device according to another embodiment of the invention.

FIG. 13 is a diagram showing the light emitting device 203 according to another embodiment of the invention. Referring to FIG. 13, the light emitting device 203 includes a large white light emitting pallet 1301. Furthermore, although only the white light emitting pallet 1301 is used in the present embodiment, the invention is not limited thereto. For example, a device capable of changing a frequency distribution may be used as each of the white light emitting pallet 1301.

Figure 14:
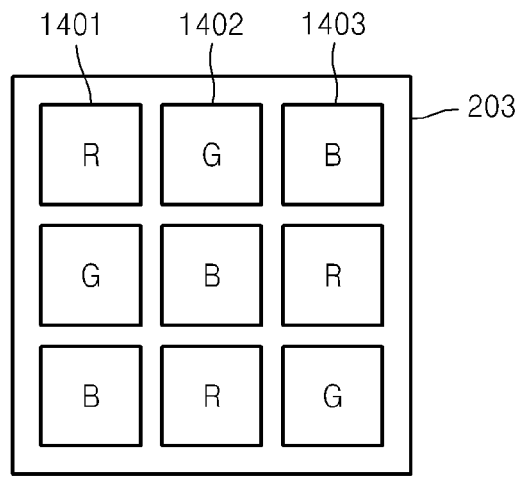
FIG. 14 is a plan view diagram showing a light emitting device according to another embodiment of the invention.

FIG. 14 is a diagram showing the light emitting device 203 according to another embodiment of the invention. Referring to FIG. 14, the light emitting device 203 includes three red light emitting pallets 1401, three green light emitting pallets 1402, and three blue light emitting pallets 1403.

Figure 15:
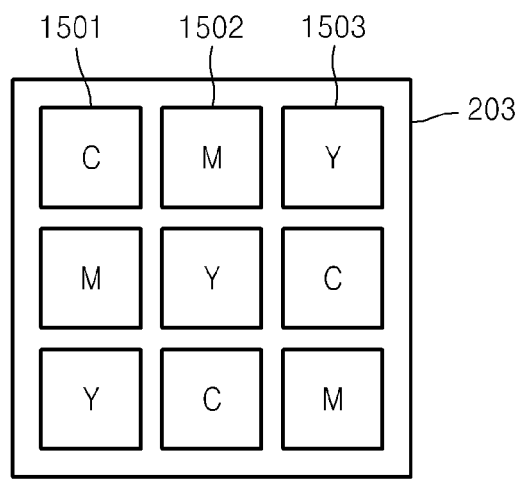
FIG. 15 is a plan view diagram showing a light emitting device according to another embodiment of the invention.

FIG. 15 is a diagram showing the light emitting device 203 according to another embodiment of the invention. Referring to FIG. 15, the reference numeral C denotes a cyan light emitting pallet 1501, the reference numeral M denotes a magenta light emitting pallet 1502, and the reference numeral Y denotes a yellow light emitting pallet 1503. In other words, the present embodiment employs nine light emitting pallets of three colors, which include cyan, magenta, and yellow.

Figure 16:
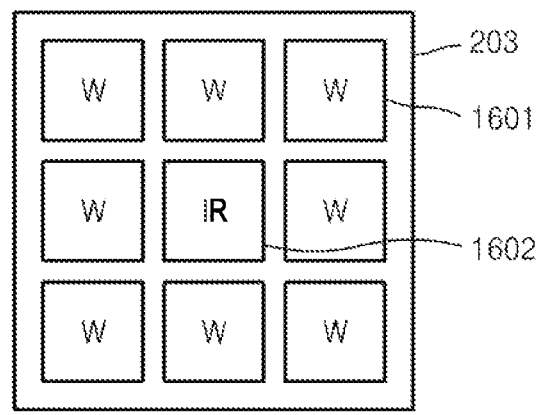
FIG. 16 is a plan view diagram showing a light emitting device according to another embodiment of the invention.

FIG. 16 is a diagram showing the light emitting device 203 according to another embodiment of the invention. Referring to FIG. 16, the light emitting device 203 includes white light emitting pallets 1601 and an infrared ray (IR) emitting pallet 1602. The present embodiment may be applied to phase detection AF. Generally, during phase detection AF, a red LED emitting strong IR is used as an AF auxiliary light in a dark surrounding. However, according to the present embodiment, IR includes near IR and may denote lights of wavelengths from about 650 nm to about 780 nm. The reason of using the IR is to prevent glare while the AF auxiliary light is emitting light. For example, the peak wavelength may be about 700 nm. The IR emitting pallet 1602 may be arranged at the center of the white light emitting pallets 1601.

Figure 17:
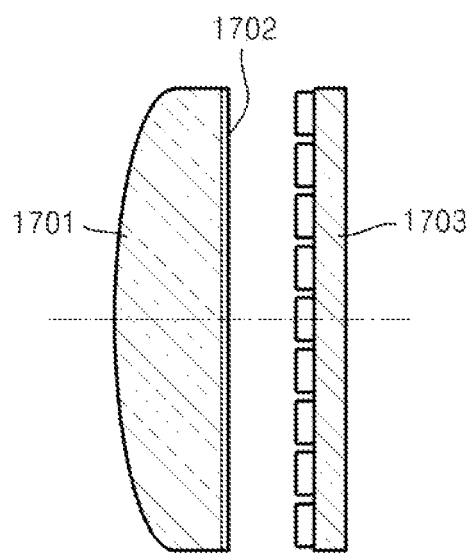
FIG. 17 is a side view diagram showing a lighting device according to another embodiment of the invention.

FIG. 17 is a diagram showing the lighting device 125 according to another embodiment of the invention. Referring to FIG. 17, an emission lens 1701 and a panel constituting a non-reflective structure, that is, an opening 1702 may be formed as a single body. Accordingly, by forming the emission lens 1701 and the opening 1702 as a single component, the manufacturing cost may be reduced. Furthermore, since a structure including a non-reflective structure is formed inside, the structure including the non-reflective structure is not affected by dust and may be prevented from being deformed.

Figure 18:
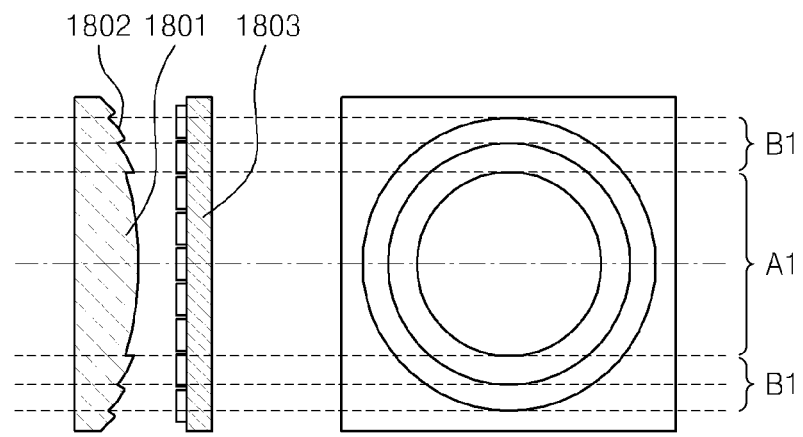
FIG. 18 is a combined side and plan view diagram showing a lighting device according to another embodiment of the invention.

FIG. 18 is a diagram showing the lighting device 125 according to another embodiment of the invention. The left part of FIG. 18 is a lateral view of the lighting device 125, whereas the right part of FIG. 18 is a front view of the lighting device 125.

Referring to FIG. 18, an emission lens 1801 and an opening 1802 may be formed as a single body. Furthermore, the emission lens 1801 is formed close to a light source. The emission lens 1801 may be a Fresnel lens, and structures constituting a non-reflective structure are formed on a surface of the Fresnel lens.

Periods of the structures formed on a surface of the Fresnel lens may vary according to positions on the Fresnel lens. The structures are arranged in a period A1 at the center of the Fresnel lens, whereas the structures are arranged in a period B1 at the peripheral region of the Fresnel lens. Here, the period B1 is greater than the period A1. In other words, the structures are more densely arranged at the peripheral region of the Fresnel lens because angles of incidence are greater at the peripheral region of the Fresnel lens.

LED flip chips may be bonded to a substrate as a light emitting device 1803.

Figure 19:
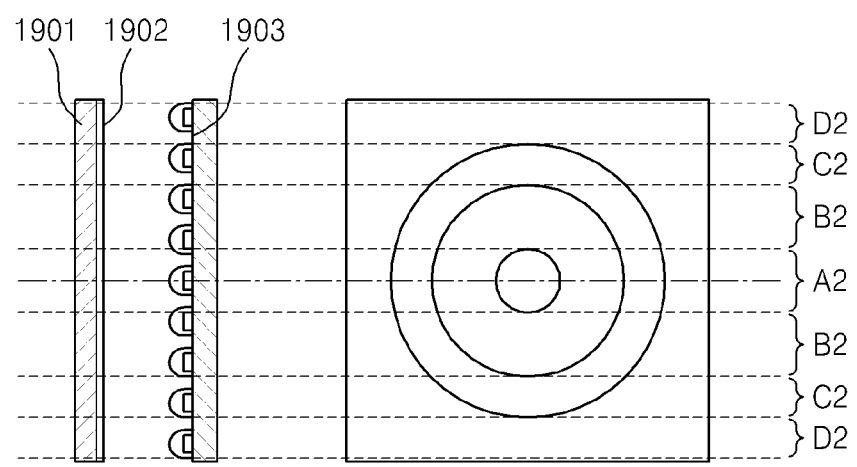
FIG. 19 is a combined side and plan view diagram showing a lighting device according to another embodiment of the invention.

FIG. 19 is a diagram showing the lighting device 125 according to another embodiment of the invention. The left part of FIG. 19 is a lateral view of the lighting device 125, whereas the right part of FIG. 19 is a front view of the lighting device 125.

Referring to FIG. 19, an emission lens is formed at a resin portion covering LED pallets. Furthermore, the lighting device 125 includes a LED 1903 to which a dome-type lens is attached and a panel 1901 on which structures 1902 constituting a non-reflective structure are formed.

Like in the embodiment shown in FIG. 19, periods of the structures change (increase) in the order of A2, B2, C2, and D2 from the center region of the panel 1901 to the peripheral region of the panel 1901.

Figure 20:
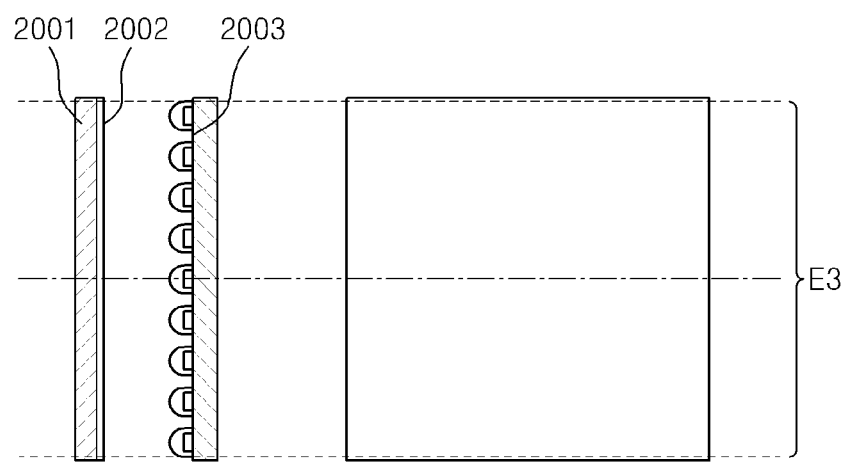
FIG. 20 is a combined side and plan view diagram showing a lighting device according to another embodiment of the invention.

FIG. 20 is a diagram showing the lighting device 125 according to another embodiment of the invention. The left part of FIG. 20 is a lateral view of the lighting device 125, whereas the right part of FIG. 20 is a front view of the lighting device 125.

Referring to FIG. 20, like in the embodiment shown in FIG. 19, the lighting device 125 includes a LED 2003 to which a dome-type lens is attached and a panel 2001, where structures 2002 constituting a non-reflective structure are formed on the panel 2001. Furthermore, the structures 2002 are arranged at a plurality of periods from about 150 nm to about 300 nm. For example, the structures 2002 may be formed as shown in FIG. 12 or the structures 2002 may be arranged at random periods.

As described above, according to embodiments of the invention, structures constituting a non-reflective structure for efficiently out-coupling light from a light emitting device to the outside are formed at the lighting device 125. Therefore, the lighting device 125 or a photographing system including the same, such as the digital photographing device 1, may efficiently emit light to the outside.

The particular implementations shown and described herein are illustrative examples of the invention and are not intended to otherwise limit the scope of the invention in any way. For the sake of brevity, conventional electronics, control systems, software development and other functional embodiments of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A lighting device comprising:
   a plurality of light emitting devices which emit lights of wavelengths within the visible ray domain; and
   an opening arranged in front of the plurality of light emitting devices,
   wherein the plurality of light emitting devices are arranged in a medium having a low refraction index, and
   solid structures that are formed of a medium having a high refraction index, are capable of transmitting visible rays therethrough, and are periodically formed on a portion of the opening to face the plurality of light emitting devices in the medium having a low refraction index,
   wherein the solid structures are formed in a period such that lights emitted by the plurality of light emitting devices are not reflected,
   wherein, at the opening, the solid structures are arranged in a first period in front of the center region of the plurality of light emitting devices, and
   the solid structures are arranged in a second period in front of the peripheral region of the plurality of light emitting devices, wherein the second period is greater than the first period.

2. The lighting device of claim 1, wherein the solid structures arranged in the first period are arranged in a four-direction arrangement, and
   the solid structures arranged in the second period are arranged in a six-direction arrangement.

3. The lighting device of claim 1, wherein the first period is from about 150 nm to about 250 nm, and the second period is from about 200 nm to about 300 nm.

4. The lighting device of claim 1, wherein, at the opening, a Fresnel lens for emitting auxiliary light is arranged on a surface facing the light emitting devices, and
   the solid structures are formed on a surface of the Fresnel lens.

5. The lighting device of claim 4, wherein the solid structures are arranged in a first period at the center region of the Fresnel lens, and
   the solid structures are arranged in a second period at the peripheral region of the Fresnel lens, wherein the second period is greater than the first period.

6. The lighting device of claim 1, wherein, at the opening, a lens for emitting auxiliary light is arranged on a surface facing the light emitting devices.

7. The lighting device of claim 1, wherein the lighting device is used as an auxiliary light for a camera.

8. The lighting device of claim 7, wherein the auxiliary light for a camera is either a photographing auxiliary light or an auxiliary light for focus detection.

9. The lighting device of claim 1, wherein the solid structures are arranged in a period from about 150 nm to about 300 nm,
   the high refraction index is from about 1.4 to about 2.2, and
   the low refraction index is a refraction index of air.

10. The lighting device of claim 1, wherein the light emitting device is a LED, an EL, or an OLED.

11. The lighting device of claim 1, wherein the light emitting device emits lights of wavelengths from about 400 nm to about 700 nm.

12. The lighting device of claim 1, wherein the light emitting devices emit color lights of a first group consisting of white, red, green, and blue, a second group consisting of cyan, magenta, and yellow, or a combination thereof.

13. The lighting device of claim 1, wherein wavelengths of lights emitted by the light emitting devices are variable.

14. The lighting device of claim 1, wherein the embodiment ratio of the solid structure is 1 or greater.

15. The lighting device of claim 1, wherein the solid structure is a cone structure, a circular cylinder structure, a flat panel structure, or a circular truncated cone structure.

16. The lighting device of claim 1, wherein the solid structures are arranged in a four-direction arrangement or a six-direction arrangement.

17. The lighting device of claim 1, further comprising an infrared ray (IR) emitting device which emits lights of wavelengths within IR domain,
   wherein the solid structures are formed to prevent reflection of the lights of wavelengths within IR domain.

18. The lighting device of claim 17, wherein the IR emitting device emits color lights of a red light emitting device, an IR emitting device, or a combination thereof.

19. A photographing system comprising:
   an image capturing unit which captures images of an object;
   a lighting device which emits light to the object; and
   a lighting control unit which controls light emission of the lighting device,
   wherein the lighting device comprises:
   a plurality of light emitting devices which emit lights of wavelengths within visible ray domain; and
   an opening arranged in front of the plurality of light emitting devices,
   wherein the plurality of light emitting devices are arranged in a medium with a low refraction index,
   solid structures that are formed of a medium having a high refraction index, are capable of transmitting visible rays therethrough, and are periodically formed on a portion of the opening to face the plurality of light emitting devices in the medium having a low refraction index, and
   wherein the solid structures are arranged in a period such that lights emitted by the plurality of light emitting devices are not reflected,
   wherein, at the opening, the solid structures are arranged in a first period in front of the center region of the plurality of light emitting devices, and
   the solid structures are arranged in a second period in front of the peripheral region of the plurality of light emitting devices, wherein the second period is greater than the first period.

* * * * *